Patented Dec. 17, 1935

2,024,575

UNITED STATES PATENT OFFICE 2,024,575

METHOD OF PREPARING DITHIAZYL DISULPHIDES

Albert J. Gracia, Cuyahoga Falls, Ohio, assignor to Wingfoot Corporation, Wilmington, Del., a corporation of Delaware No Drawing. Application November 23, 1933, Serial No. 699,410

18 Claims. (Cl. 260—16)

This invention relates to an improved method of preparing dithiazyl disulphides, particularly dibenzothiazyl disulphide. Among the objects attained by this invention is that of obtaining purer and whiter products than has been possible to obtain heretofore. Another object is to effect the desired synthesis by a simple and efficient method. Among the advantages of the invention is the fact that by its practice undesirable features of prior art processes are eliminated.

It has been known heretofore to prepare dibenzothiazyl disulphide by treating an aqueous suspension of mercaptobenzothiazole with dilute nitric acid. This process, while efficient, has disadvantages in that it is difficult to obtain thereby a pure, white product.

According to the present invention, dibenzothiazyl disulphide is prepared by a simple and efficient process in excellent yield and in the form of substantially pure white crystals. The process is carried out by heating an aqueous alkaline solution of a mercaptothiazole, mixing therewith an aqueous solution of hydrogen peroxide and sulphuric acid and segregating the resulting precipitated dibenzothiazyl disulphide. For most purposes the segregating operation need involve nothing more than filtering, washing and drying the product.

While heating the aqueous solution of mercaptobenzothiazole is not essential in all cases, it will usually be found preferable for best results to heat it to a temperature of approximately 95 degrees C. prior to the addition of the oxidizing solution and to maintain the reactants at or near this temperature until the oxidation is complete. It is also desirable to agitate the reacting solution throughout the process.

As a specific example of the improved process of this invention, 420 pounds of crude, substantially pure mercaptobenzothiazole are discharged into a tank containing 800 gallons of water heated to 85–90 degrees C. The mercaptobenzothiazole is allowed to settle for a few minutes, after which the supernatant liquid is decanted off. Sufficient cold water is added to again bring the mixture up to 800 gallons. There are then added to the suspension, with agitation, 16.5 gallons of 50% sodium hydroxide solution, after which the mixture is heated to 40 degrees C. for one hour. During the heating period, the mixture should be agitated further. The mercaptobenzothiazole will have been found to have gone into solution at the end of about an hour.

After a period of a few hours during which any impurities present in the solution are allowed to settle, 675 gallons of this mercaptobenzothiazole solution, which is approximately 83.5% by volume of the original solution, are transferred to another tank wherein the solution is heated to approximately 95 degrees C. The solution is then ready for oxidizing, which is accomplished by means of a solution prepared by agitating 200 gallons of water, adding thereto 144 pounds of 30% hydrogen peroxide, and then adding carefully to this solution 98 pounds of 96% sulphuric acid.

The oxidizing solution is mixed thoroughly and is added to the heated alkaline solution of mercaptobenzothiazole, the mass being agitated throughout the operation. Dibenzothiazyl disulphide precipitates immediately. The resulting slurry may then be filtered, washed several times and the product dried. It will be found to be in the form of a substantially pure, white powder melting at 165 degrees C. The equation believed to represent the reaction is as follows:

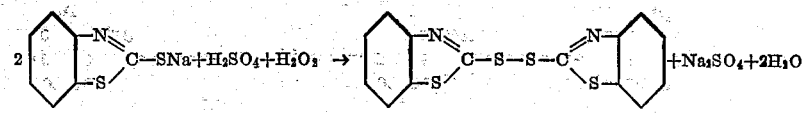

It will readily be seen that the improved process of this invention is easily carried out and requires starting materials which are easily handled. The apparatus involved is simple and the yields obtained are uniform from batch to batch and quite high, the yield being generally in the range of 95%. Furthermore, the product is whiter in color than it has been possible to obtain heretofore and contains no impurities which might interfere with the subsequent employment of the product.

It is to be understood that other mercaptothiazoles, such as 1-mercaptothiazole, 1-mercaptonaphthothiazole, 1-mercapto 3-phenyl benzothiazole, 1-mercapto 4-nitro benzothiazole, 1-mercapto 5-chlor benzothiazole, 1-mercapto 3-methyl thiazole, 1-mercapto 4-chlor benzothiazole, 1-mercapto 5-nitro benzothiazole, 1-mercapto 5-ethoxy benzothiazole, 1-mercapto 5-hydroxy benzothiazole and 1-mercapto alkyl benzothiazoles may be employed in place of 1-mercaptobenzothiazole to give the corresponding disulphides. By the term "benzenoid" employed herein, it is intended to cover the members of the benzene and naphthalene series whether substituted or unsubstituted, typical substituents being alkyl, nitro, halogen, hydroxy and alkoxy groups.

Although the preferred form of the invention has been described in detail, it will be apparent to those skilled in the art that the invention is not so limited but that various modifications may be made therein without departing from the spirit of the invention or from the scope of the appended claims. Thus, for example, it is possible to carry out the process at ordinary room temperatures. It is intended that the patent shall cover, by suitable expression in the appended claims, whatever features of patentable novelty reside in the invention.

What is claimed is:

1. The process of preparing dibenzothiazyl disulphide which comprises heating an aqueous alkaline solution of mercaptobenzothiazole and mixing therewith an aqueous solution of hydrogen peroxide and an amount of sulphuric acid sufficient to neutralize said alkaline solution of mercaptobenzothiazole.

2. The process of preparing dibenzothiazyl disulphide which comprises heating an aqueous alkaline solution of mercaptobenzothiazole, mixing therewith an aqueous solution of hydrogen peroxide and an amount of sulphuric acid sufficient to neutralize said alkaline solution of mercaptobenzothiazole, and segregating the resulting dibenzothiazyl disulphide.

3. The process of preparing dibenzothiazyl disulphide which comprises heating an aqueous alkaline solution of mercaptobenzothiazole to a temperature in the neighborhood of 95 degrees C., adding thereto an aqueous solution of hydrogen peroxide and an amount of sulphuric acid sufficient to neutralize said alkaline solution of mercaptobenzothiazole, the thiazole solution meanwhile being agitated, and segregating the resulting dibenzothiazyl disulphide.

4. The process of preparing dibenzothiazyl disulphide which comprises suspending 1-mercapto benzothiazole in water, adding an alkali to dissolve the mercaptobenzothiazole, heating the solution to approximately 95 degrees C., adding thereto an aqueous solution containing both hydrogen peroxide and an amount of sulphuric acid sufficient to neutralize said alkaline solution of mercaptobenzothiazole, meanwhile agitating the mixture, and filtering, washing and drying the resulting precipitated dibenzothiazyl disulphide.

5. The process of preparing dibenzothiazyl disulphide which comprises forming a dilute alkaline solution of mercaptobenzothiazole in water, heating the solution to approximately 95 degrees C., adding thereto a dilute aqueous solution containing both hydrogen peroxide and an amount of sulphuric acid sufficient to neutralize said alkaline solution of mercaptobenzothiazole, meanwhile agitating the mixture, and segregating the resulting precipitated dibenzothiazyl disulphide.

6. The process of preparing a dibenzothiazyl disulphide which comprises heating an aqueous alkaline solution of a mercaptobenzothiazole and mixing therewith an aqueous solution of hydrogen peroxide and an amount of sulphuric acid sufficient to neutralize said alkaline solution of mercaptobenzothiazole.

7. The process of preparing dibenzothiazyl disulphide which comprises heating an aqueous solution of sodium benzothiazyl mercaptide to approximately 95 degrees C., adding thereto a dilute aqueous solution containing both hydrogen peroxide and an amount of sulphuric acid sufficient to neutralize said alkaline solution of mercaptobenzothiazole, meanwhile agitating the mixture and maintaining the temperature at approximately 95° C., and segregating the resulting precipitated dibenzothiazyl disulphide.

8. The process of preparing a di(benzenoid thiazyl) disulphide which comprises heating an aqueous alkaline solution of the corresponding 1-mercapto benzenoid thiazole to a temperature in the neighborhood of 95 degrees C., adding thereto an aqueous solution of hydrogen peroxide and an amount of sulphuric acid sufficient to neutralize said alkaline solution of 1-mercapto benzenoid thiazole, the thiazole solution meanwhile being agitated, and segregating the resulting di(benzenoid thiazyl) disulphide.

9. The process of preparing a dithiazyl disulphide which comprises heating an aqueous alkaline solution of the corresponding 1-mercapto thiazole with hydrogen peroxide and an amount of sulphuric acid sufficient to neutralize said alkaline solution of 1-mercaptothiazole.

10. The process of preparing a dithiazyl disulphide which comprises heating an aqueous alkaline solution of the corresponding 1-mercapto thiazole to a temperature in the neighborhood of 95 degrees C., adding thereto an aqueous solution of hydrogen peroxide and an amount of sulphuric acid sufficient to neutralize said alkaline solution of 1-mercaptothiazole, the thiazole solution meanwhile being agitated, and segregating the resulting dithiazyl disulphide.

11. The process of preparing a di(aryl thiazyl) disulphide which comprises heating an aqueous alkaline solution of the corresponding 1-mercapto aryl thiazole with hydrogen peroxide and an amount of sulphuric acid sufficient to neutralize said alkaline solution of 1-mercapto aryl thiazole.

12. The process of preparing dibenzothiazyl disulphide which comprises heating to approximately 95° C. an aqueous solution of sodium benzothiazyl mercaptide and adding thereto, meanwhile agitating the mixture and maintaining the temperature at approximately 95° C., an aqueous solution containing both hydrogen peroxide and sulphuric acid, said materials being reacted in the approximate proportions of two mols of mercaptide, one mol of peroxide and one mol of acid.

13. The process of preparing dibenzothiazyl disulphide which comprises heating to approximately 95° C. an aqueous alkaline solution of mercaptobenzothiazole and adding thereto, meanwhile agitating the mixture and maintaining the temperature at approximately 95° C., a solution of hydrogen peroxide and sulphuric acid, said alkaline mercaptobenzothiazole, peroxide and acid being reacted in the approximate proportions of two mols, one mol and one mol, respectively.

14. The process of preparing dibenzothiazyl disulphide which comprises heating to approximately 95° C. an aqueous alkaline solution of mercaptobenzothiazole and adding thereto, meanwhile agitating the mixture and maintaining the temperature at approximately 95° C., a solution of hydrogen peroxide and sulphuric acid, said peroxide, acid and mercaptobenzothiazole being reacted in the approximate proportions, respectively, of 43.2 pounds, 94.1 pounds and the amount of mercaptobenzothiazole contained in 675 gallons of an aqueous alkaline solution which is the supernatant liquid taken from an aqueous alkaline solution prepared from 420 pounds of crude, substantially pure mercaptobenzothiazole, sufficient water to bring the volume of the entire solution to approximately 808.25 gallons, and sufficient alkali to dissolve the mercaptobenzothiazole.

15. The process of preparing dibenzothiazyl disulphide which comprises heating to approximately 95° C. an aqueous solution of sodium benzothiazyl mercaptide and adding thereto, meanwhile agitating the mixture and maintaining the temperature at approximately 95° C., an aqueous solution containing both hydrogen peroxide and sulphuric acid, said materials being reacted in the approximate proportions of 43.2 pounds of peroxide, 94.1 pounds of acid and the amount of mercaptide contained in 675 gallons of an aqueous solution which is the supernatant liquid taken from an aqueous solution prepared from 420 pounds of crude, substantially pure mercaptobenzothiazole, 16.5 gallons of 50% aqueous sodium hydroxide and sufficient water to bring the volume of the entire solution to approximately 808.25 gallons.

16. The process of preparing dibenzothiazyl disulphide which comprises forming an aqueous solution of sodium benzothiazyl mercaptide from 420 pounds of crude, substantially pure mercaptobenzothiazole, allowing any impurities to settle out, separating therefrom approximately 83.5% of the supernatant liquid of said aqueous solution, heating said 83.5% portion to approximately 95° C. and adding thereto an aqueous solution containing approximately 43.2 pounds of hydrogen peroxide and approximately 44.1 pounds of sulphuric acid, meanwhile agitating the mixture and maintaining the temperature at approximately 95° C.

17. The process of preparing a dibenzothiazyl disulphide which comprises adding to an aqueous alkaline solution of a mercaptobenzothiazole heated to a temperature in the neighborhood of its boiling point a solution of hydrogen peroxide and sulphuric acid, the mixture being agitated meanwhile, said materials being reacted in the approximate proportions of two mols of mercaptobenzothiazole, one mol. of peroxide and one mol. of acid.

18. The process of preparing a dithiazyl disulphide which comprises adding to an aqueous alkaline solution of a mercaptothiazole heated to a temperature in the neighborhood of its boiling point an aqueous solution of hydrogen peroxide and sulphuric acid, said mercaptothiazole solution being agitated meanwhile, said materials being reacted in the approximate proportions of two mols of mercaptothiazole, one mol. of peroxide and one mol. of acid.

ALBERT J. GRACIA.